US 11,139,719 B2

(12) United States Patent
Konopa

(10) Patent No.: US 11,139,719 B2
(45) Date of Patent: Oct. 5, 2021

(54) DUAL FLUID ROTATING SHAFT

(71) Applicant: Hamilton Sundstrand Corporation, Charlotte, NC (US)

(72) Inventor: Brian C. Konopa, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 287 days.

(21) Appl. No.: 16/274,843

(22) Filed: Feb. 13, 2019

(65) Prior Publication Data
US 2020/0259398 A1   Aug. 13, 2020

(51) Int. Cl.
  *H02K 9/19*   (2006.01)
  *H02K 7/08*   (2006.01)
  *H02K 9/00*   (2006.01)
  *F01D 25/12*   (2006.01)
  *F01D 25/18*   (2006.01)
  *F16C 3/02*   (2006.01)

(52) U.S. Cl.
  CPC .............. *H02K 9/19* (2013.01); *H02K 7/083* (2013.01); *H02K 9/00* (2013.01); *F01D 25/12* (2013.01); *F01D 25/18* (2013.01); *F05D 2240/61* (2013.01); *F05D 2260/20* (2013.01); *F16C 3/02* (2013.01); *F16C 2380/26* (2013.01)

(58) Field of Classification Search
  CPC .......... H02K 9/193; H02K 9/19; H02K 7/003; H02K 9/005; H02K 7/083; H02K 5/20; H02K 1/20; H02K 9/10
  See application file for complete search history.

(56) References Cited

U.S. PATENT DOCUMENTS 4,341,296 A   7/1982  Schaefer et al.
6,460,504 B1  10/2002  Phillips et al.
(Continued)

FOREIGN PATENT DOCUMENTS

DE   102007043656 A1   5/2009
DE   102016216479 A1   3/2018
(Continued)

OTHER PUBLICATIONS

Extended European Search Report dated Jun. 15, 2020, issued during the prosecution of European Patent Application No. EP 19210028.7.

*Primary Examiner* — Tran N Nguyen
*Assistant Examiner* — Leda T Pham
(74) *Attorney, Agent, or Firm* — Locke Lord LLP; Joshua L. Jones; Scott D. Wofsy

(57) ABSTRACT

A system includes a shaft body defining a longitudinal axis. A first internal fluid channel extends axially within the shaft body and includes an inlet opening through the shaft body for fluid communication of external fluid into the first internal fluid channel and an outlet opening through the shaft body for fluid communication of fluid from the first internal fluid channel to an area external of the shaft body. A second internal fluid channel extends axially within the shaft body and includes an inlet opening through the shaft body for fluid communication of external fluid into the second internal fluid channel and an outlet opening through the shaft body for fluid communication of fluid from the second internal fluid channel to an area external of the shaft body. The first and second internal fluid channels are in fluid isolation from one another within the shaft body.

16 Claims, 2 Drawing Sheets

(56) References Cited

U.S. PATENT DOCUMENTS

| | | |
|---|---|---|
| 8,910,666 B2 | 12/2014 | Anderson et al. |
| 2011/0298314 A1* | 12/2011 | Atarashi ................ B60K 6/405 |
| | | 310/54 |
| 2015/0214816 A1 | 7/2015 | Raad |
| 2015/0280525 A1 | 10/2015 | Rippel et al. |
| 2017/0237316 A1 | 8/2017 | Filgertshofer |
| 2018/0191225 A1* | 7/2018 | Paul ........................ H02K 9/19 |
| 2018/0320547 A1 | 11/2018 | Bentley et al. |

FOREIGN PATENT DOCUMENTS

| | | |
|---|---|---|
| EP | 2562914 A1 | 2/2013 |
| EP | 2975741 A2 | 1/2016 |
| FR | 3065124 A1 | 10/2018 |
| WO | 2008/045413 A2 | 4/2008 |

* cited by examiner

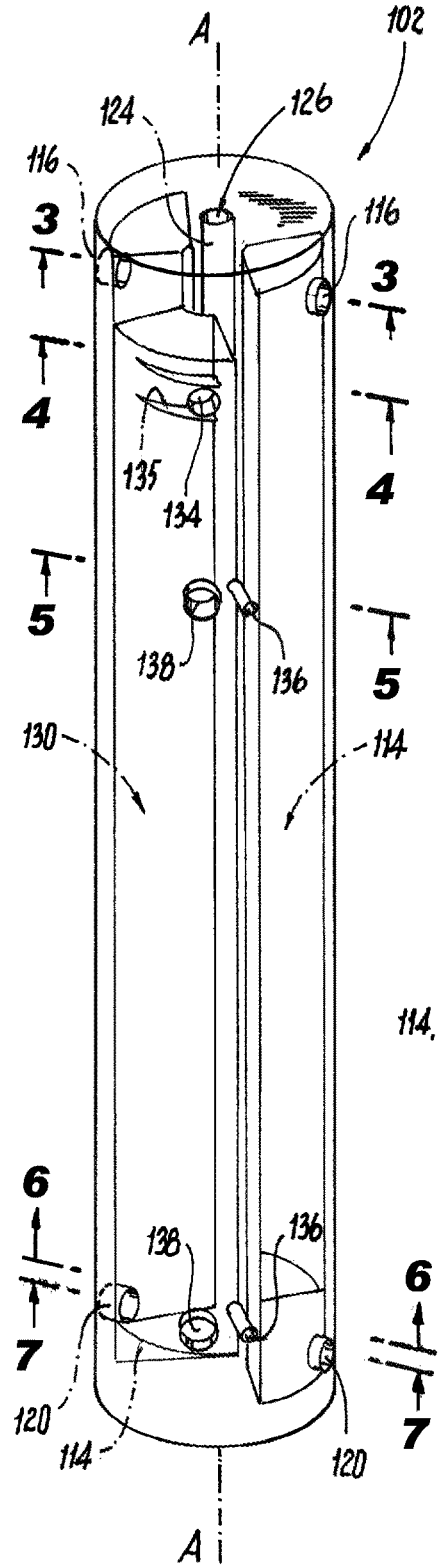
Fig. 2
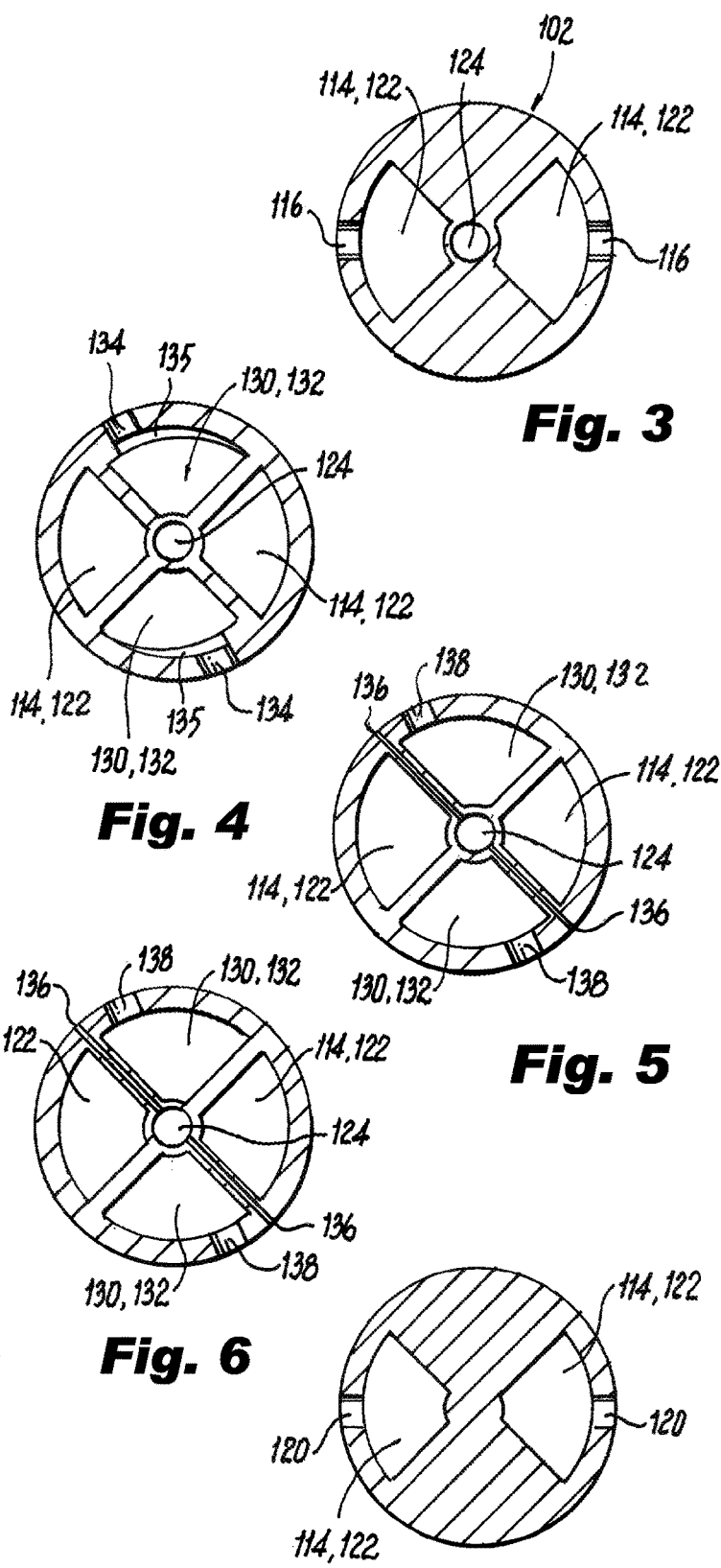
Fig. 3
Fig. 4
Fig. 5
Fig. 6
Fig. 7

DUAL FLUID ROTATING SHAFT

BACKGROUND OF THE INVENTION

1. Field of the Invention

The present disclosure relates to rotary components, and more particularly to rotating shafts such as in electrical motors, generators and the like.

2. Description of Related Art

The amount of heat created by an electrical machine such as a generator requires cooling. In some generators, a coolant is required to dissipate heat. The bearings also require lubricant to ensure proper bearing function. Designers choose a coolant that can double as the lubricant or else choose a lubricant that can double as a coolant. This compromise limits designs.

The conventional techniques have been considered satisfactory for their intended purpose. However, there is an ever present need for improved cooling and lubrication. This disclosure provides a solution for this need.

SUMMARY OF THE INVENTION

A system includes a shaft body defining a longitudinal axis. A first internal fluid channel extends axially within the shaft body and includes an inlet opening through the shaft body for fluid communication of external fluid into the first internal fluid channel and an outlet opening through the shaft body for fluid communication of fluid from the first internal fluid channel to an area external of the shaft body. A second internal fluid channel extends axially within the shaft body and includes an inlet opening through the shaft body for fluid communication of external fluid into the second internal fluid channel and an outlet opening through the shaft body for fluid communication of fluid from the second internal fluid channel to an area external of the shaft body. The first and second internal fluid channels are in fluid isolation from one another within the shaft body.

The second internal fluid channel can be configured for airflow through the shaft body. The first internal fluid channel can be configured for lubricant flow. An internal coolant channel can extend axially within the shaft body and can include an inlet opening through the shaft body for fluid communication of external coolant into the internal coolant channel and an outlet opening through the shaft body for fluid communication of coolant from the internal coolant channel to an area external of the shaft body. The first and second internal fluid channels and the internal coolant channel can be in fluid isolation from one another within the shaft body.

The first internal fluid channel can be configured for coolant flow. An internal lubricant channel can extend axially within the shaft body and can include an inlet opening through the shaft body for fluid communication of external lubricant into the internal lubricant channel and an outlet opening through the shaft body for fluid communication of lubricant from the internal lubricant channel to an area external of the shaft body, wherein the first and second internal fluid channels and the internal lubricant channel are in fluid isolation from one another within the shaft body.

The inlet and outlet openings of the first internal fluid channel can extend in a lateral direction relative to the longitudinal axis. The inlet and outlet openings of the second internal fluid channel can open in an axial direction and a radial direction, respectively, relative to the longitudinal axis. The second internal fluid channel can extend along the longitudinal axis. The first internal fluid channel can include two diametrically opposed sub-channels for balanced rotation of the shaft body. The first internal fluid channel can include at least one additional outlet. The second internal fluid channel can include a plurality of radially extending outlet openings extending therefrom. The inlet opening of the first internal fluid channel can be located within an internal ramp configured to facilitate ingestion of incoming fluid by centripetal forces.

An electrical machine rotor can be mounted to the shaft body wherein seals sealing between the rotor and the shaft body maintain fluid isolation between the inlet openings and outlet openings of the first and second internal fluid channels. A support shaft can be included, wherein the shaft body is seated within the support shaft and wherein the support shaft supports the rotor. A stator can be included with the rotor and shaft body mounted to bearings for rotation relative to the stator. The outlet opening of the first internal fluid channel can be positioned to supply lubricant to the bearings. The outlet opening of the first internal fluid channel can be positioned to supply coolant to windings in at least one of the stator and the rotor.

A method of operating an electrical machine includes issuing a liquid from a first internal fluid channel of a rotating shaft to a component in the electrical machine. The method includes issuing air from a second internal fluid channel of the rotating shaft. Issuing air and issuing a liquid include keeping the air and liquid in fluid isolation from each other within the rotating shaft.

Issuing air can include using compressed air to mist the liquid to issue a mist of the liquid to the component of the electrical machine. The liquid can be a coolant and the component can be a heat generating component wherein the method includes issuing lubricant to a bearing of the electrical machine from an internal lubricant channel of the rotating shaft, maintaining the lubricant, air, and coolant in fluid isolation from one another within the rotating shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic perspective view of the rotating shaft of FIG. 1, showing sub-channels of the internal lubricant and coolant channels, and respective inlet and outlet openings thereof; and FIGS. 3-7 are schematic axial cross-sectional views of the rotating shaft of FIG. 1, showing the cross-sections at different axial locations.

DETAILED DESCRIPTION OF THE PREFERRED EMBODIMENTS

Figure 1:
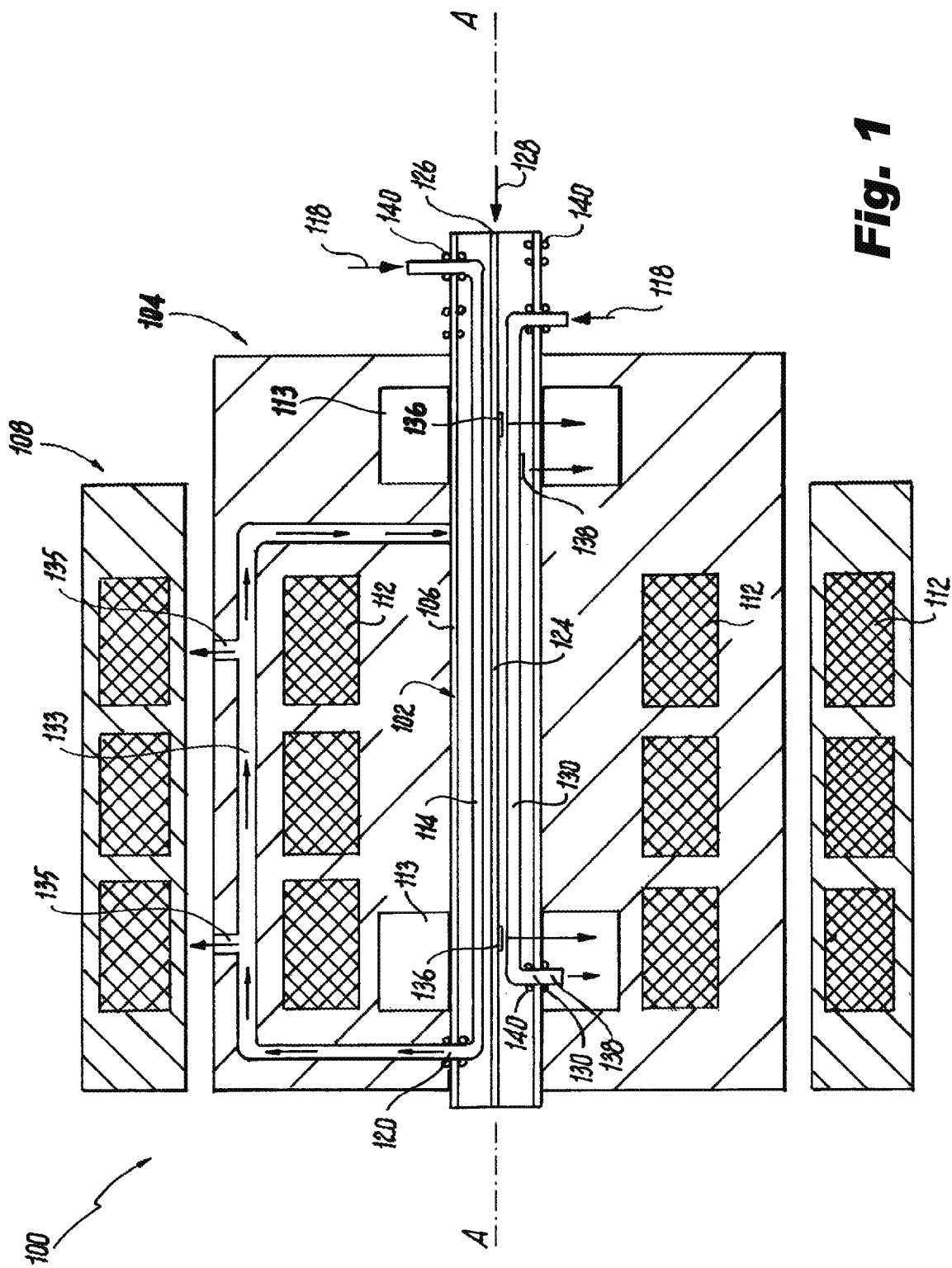
FIG. 1 is a schematic side-elevation view of an exemplary embodiment of a system constructed in accordance with the present disclosure, showing an electrical machine having a rotating shaft with an internal coolant channel, an internal lubricant channel, and an internal air channel all in fluid isolation from one another within the rotating shaft.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to provide both coolant and lubricant to the desired locations within an electoral machine such as a generator while keeping the coolant and the lubricant fluidly isolated. The system 100 includes a shaft body 102 defining a longitudinal axis A. An electrical machine rotor 104 is mounted to the shaft body 102. A support shaft 106 is included, wherein the shaft body 102 is seated within the support shaft 106 and wherein the support shaft supports the rotor 104. A stator 108 can be included with the rotor 104 and shaft body 102 mounted to bearings 110 for rotation relative to the stator 108. The stator 108 and rotor 104 include heat generating magnetic field elements 112, which can include permanent magnets, windings, a combination thereof, or the like.

With reference now to FIG. 2, a first internal fluid channel, namely internal coolant channel 114, extends axially within the shaft body 102 and includes an inlet opening 116 through the shaft body 102 for fluid communication of external coolant fluid (schematically indicated by flow arrow 118 in FIG. 1) into the internal coolant channel 114 and an outlet opening 120 through the shaft body 102 for fluid communication of coolant fluid from the internal coolant channel 114 to an area external of the shaft body 102. As shown in the cross-section of FIGS. 3 and 7, the internal coolant channel 114 includes two diametrically opposed annular segment shaped sub-channels 122 (for balanced rotation of the shaft body 102), each with a respective inlet opening 116 and outlet opening 120, for balanced rotation of the shaft body 102.

A second internal fluid channel, namely an internal air channel 124, configured for airflow through the shaft body 102, extends axially within the shaft body 102 and includes an inlet opening 126 through the shaft body 102 for fluid communication of external fluid, e.g. compressed air from an air compressor as indicated schematically by flow arrow 128 in FIG. 1, into the second internal fluid channel and a plurality of radially (relative to the longitudinal axis A) extending outlet openings 136 through the shaft body 102 (two of which are shown in FIG. 2, each of which has a diametrically opposed outlet opening 136 as the ones indicated in FIGS. 5 and 6) for fluid communication of air from the second internal fluid channel 124 to an area external of the shaft body 102. The internal air channel extends centered along the longitudinal axis A.

An internal lubricant channel 130 extends axially within the shaft body 102, including two sub-channels 132 one of which is labeled in FIG. 2, but see FIGS. 4-6. Each sub-channel 132 includes an inlet opening 134 through the shaft body 102 for fluid communication of external lubricant into the internal lubricant channel 130 and two outlet openings 138 (two of which are shown in FIG. 2 and an additional one of which is shown in FIG. 5) through the shaft body 102 for fluid communication of lubricant from the internal lubricant channel 130 to an area external of the shaft body 102. The inlet openings 134 are located within an internal ramp 135 configured to facilitate ingestion of incoming fluid by centripetal forces. As shown in the cross-section of FIGS. 4 and 5, the internal lubricant channel 130 includes two diametrically opposed annular segment shaped sub-channels 132 (for balanced rotation of the shaft body 102).

The internal lubricant, coolant, and air channels 130, 114, 124 are in fluid isolation from one another within the shaft body 102. The inlet and outlet openings 116, 120, 134, 138 of the internal coolant and lubrication channels 114, 130 extend in a lateral direction relative to the longitudinal axis A. The inlet opening of the internal air channel 124 opens in an axial direction relative to the longitudinal axis A, and the outlet openings 136 of the internal air channel 124 open in a radial direction relative to the longitudinal axis A.

With reference again to FIG. 1, seals 140 are included sealing between the rotor 104 and the support shaft 106, as well as between the shaft body 102 and the and the support shaft 106 to maintain fluid isolation between the inlet openings and outlet openings 126, 116, 134, 120, 136, 138 of the internal fluid channels 114, 124, 130. Support shaft 106 is ported and/or includes channels in its inner surface as needed to route fluids from the shaft body 102 to the electrical machine components of the rotor 104, bearings 113, and stator 108. The outlet openings 138 of the internal lubricant channel 130 are positioned to supply lubricant to the bearings 113 (as indicated in FIG. 1), and there are adjacent outlet openings 136 of the internal air channel 124 for out letting compressed air adjacent the lubricant issuing from the outlet openings 138, e.g. to cause a misting of the lubricant. The outlet openings 120 of the internal coolant channel 114 are positioned to supply coolant to magnetic field elements 112 in at least one of the stator 108 and the rotor 104, which can include internal coolant channels 133 and outlets 135.

A method of operating an electrical machine, e.g., a generator, includes issuing a liquid from a first internal fluid channel, e.g., internal lubricant or coolant channels 130, 114, of a rotating shaft, e.g., shaft body 102, to a component, e.g., bearings 113, in the electrical machine. The method includes issuing air from a second internal fluid channel, e.g. internal air channel 124, of the rotating shaft. Issuing air and issuing a liquid include keeping the air and liquid in fluid isolation from each other within the rotating shaft.

Systems and methods as disclosed herein allow for use of two separate liquids for coolant and lubricant, in addition to a separate channel for compressed air. In this way, designers do not have to compromise with a single fluid for use as both coolant and lubricant. A shaft body 102 as disclosed herein can be made using additive manufacturing to form the internal flow channels.

The methods and systems of the present disclosure, as described above and shown in the drawings, provide for cooling and lubrication, e.g., for electrical machines such as generators, with superior properties including keeping coolant and lubricant fluidly isolated. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
    a shaft body defining a longitudinal axis;
    a first internal fluid channel extending axially within the shaft body and including an inlet opening through the shaft body for fluid communication of external fluid into the first internal fluid channel and an outlet open- ing through the shaft body for fluid communication of fluid from the first internal fluid channel to an area external of the shaft body, wherein the first internal fluid channel is configured for lubricant flow;

a second internal fluid channel extending axially within the shaft body and including an inlet opening through the shaft body for fluid communication of external fluid into the second internal fluid channel and an outlet opening through the shaft body for fluid communication of fluid from the second internal fluid channel to an area external of the shaft body, wherein the second internal fluid channel is configured for airflow through the shaft body; and a third internal fluid channel extending axially within the shaft body and including an inlet opening through the shaft body for fluid communication of external coolant into the internal coolant channel and an outlet opening through the shaft body for fluid communication of coolant from the internal coolant channel to an area external of the shaft body, wherein the first, second, and third internal fluid channels are in fluid isolation from one another within the shaft body.

2. The system as recited in claim 1, wherein the inlet and outlet openings of the first internal fluid channel extend in a lateral direction relative to the longitudinal axis.

3. The system as recited in claim 1, wherein the inlet and outlet openings of the second internal fluid channel open in an axial direction and a radial direction, respectively, relative to the longitudinal axis.

4. The system as recited in claim 1, wherein the second internal fluid channel extends along the longitudinal axis.

5. The system as recited in claim 3, wherein the first internal fluid channel includes two diametrically opposed sub-channels for balanced rotation of the shaft body.

6. The system as recited in claim 1, wherein the first internal fluid channel includes at least one additional outlet.

7. The system as recited in claim 1, wherein the second internal fluid channel includes a plurality of radially extending outlet openings extending therefrom.

8. The system as recited in claim 1, wherein the inlet opening of the first internal fluid channel is located within an internal ramp configured to facilitate ingestion of incoming fluid by centripetal forces.

9. The system as recited in claim 1, further comprising an electrical machine rotor mounted to the shaft body wherein seals sealing between the rotor and the shaft body maintain fluid isolation between the inlet openings and outlet openings of the first and second internal fluid channels.

10. The system as recited in claim 9, further comprising a support shaft, wherein the shaft body is seated within the support shaft and wherein the support shaft supports the rotor.

11. The system as recited in claim 9, further comprising a stator with the rotor and shaft body mounted to bearings for rotation relative to the stator.

12. The system as recited in claim 11, wherein the outlet opening of the first internal fluid channel is positioned to supply coolant to windings in at least one of the stator and the rotor.

13. A method of operating an electrical machine comprising:

issuing a liquid from a first internal fluid channel of a rotating shaft to a component in the electrical machine, wherein the first internal fluid channel is configured for lubricant flow; and issuing air from a second internal fluid channel of the rotating shaft, wherein issuing air and issuing a liquid include keeping the air and liquid in fluid isolation from each other within the rotating shaft, wherein the second internal fluid channel is configured for airflow through the rotating shaft;

issuing a liquid from a third internal fluid channel extending axially within the rotating shaft and including an inlet opening through the rotating shaft for fluid communication of external coolant into the internal coolant channel and an outlet opening through the rotating shaft for fluid communication of coolant from the internal coolant channel to an area external of the rotating shaft, wherein the first, second, and third internal fluid channels are in fluid isolation from one another within the rotating shaft.

14. The method as recited in claim 13, wherein issuing air includes using compressed air to mist the liquid to issue a mist of the liquid to the component of the electrical machine.

15. The method as recited in claim 13, wherein the liquid is a coolant and the component is a heat generating component.

16. The method as recited in claim 15, further comprising:

issuing lubricant to a bearing of the electrical machine from an internal lubricant channel of the rotating shaft, maintaining the lubricant, air, and coolant in fluid isolation from one another within the rotating shaft.

* * * * *